Dec. 11, 1928.
P. D. PECK ET AL
1,694,667
MITERED JOINT BRACKET
Filed May 23, 1927
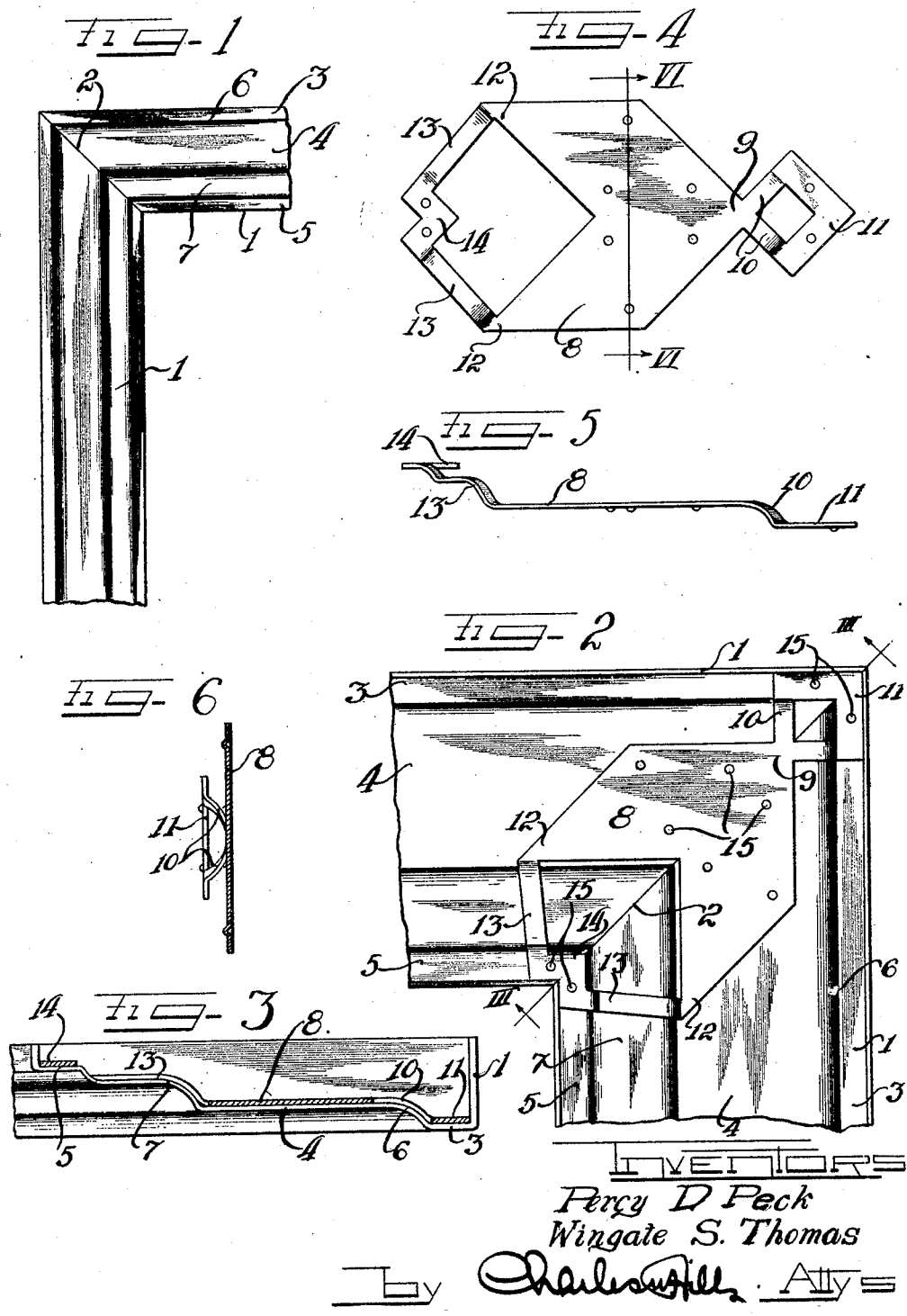
Inventors
Percy D Peck
Wingate S. Thomas Patented Dec. 11, 1928.

1,694,667

UNITED STATES PATENT OFFICE.

PERCY D. PECK AND WINGATE S. THOMAS, OF CHICAGO, ILLINOIS, ASSIGNORS TO KNAPP BROTHERS MANUFACTURING CO., OF CHICAGO, ILLINOIS, A CORPORATION OF ILLINOIS.

MITERED-JOINT BRACKET.

Application filed May 23, 1927. Serial No. 193,498.

This invention relates to an improved mitered joint for metal frames and the like and more particularly to an improved mitered joint bracket and the method of securing the same in place to rigidly hold the mitered ends of a pair of frame members in rigid abutting position to form a substantial mitered corner for a metal frame. Heretofore mitered joints for metal frames have been formed by using a plurality of angle plates of different sizes on the inner side of the corner of a metal frame, said bracket plates being welded or otherwise secured in position.

It is an object of this invention to provide an improved mitering bracket constructed of a single piece of metal and so constructed that the end portions thereof may engage the inner and outer corners of a mitered joint while the intermediate portion is adapted to seat flatly against the intermediate flat portion of the corner of the frame, after which the different sections are adapted to be spot welded or otherwise rigidly secured in place to form a rigid mitered joint.

It is also an object of this invention to provide a one piece mitering joint bracket with portions thereof positioned in different planes to permit the bracket to seat diagonally within a corner of a metal frame and be welded therein to form a rigid mitered joint between the abutting frame members.

It is an important object of this invention to provide an improved mitered joint bracket struck from sheet metal having end angle sections integrally connected with and offset in opposite directions from an intermediate or main body section to permit the bracket to seat in a metal frame against flat portions disposed in different parallel planes and be welded thereto to hold the frame members rigidly mitered one to the other.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary top elevation of a corner of a metal frame.

Figure 2 is an enlarged rear view of the corner of the metal frame equipped with a mitering joint bracket embodying the principles of this invention.

Figure 3 is a sectional view of the corner of the frame taken on line III—III of Figure 2.

Figure 4 is a top plan view of a mitered joint bracket embodying the principles of this invention.

Figure 5 is a side elevation thereof.

Figure 6 is a transverse section of the bracket taken on line VI—VI of Figure 4.

As shown on the drawings:

The reference numerals 1 indicate a pair of metal frame moldings, the ends of which are beveled or mitered at 2 to permit the ends of said frame moldings to abut one another at right angles to form a frame corner. Each of the frame moldings is provided with an outer flat portion 3, an intermediate flat portion 4, and an inner flat portion 5, with said flat portions 3 and 5 being disposed on opposite sides of the main or intermediate flat portion 4. The outer flat portion 3 is integrally connected with the intermediate flat portion 4 by a rounded connecting section 6 while the inner flat section 5 is connected with the inner margin of the intermediate flat portion 4 by means of a curved portion 7.

For the purpose of connecting the two mitered ends of the frame sections or moldings 1 together to form a rigid mitered corner of a metal frame, applicant uses an improved one piece metal bracket constructed by stamping the same from a sheet of metal and bending the end portions of the bracket out of the plane of the intermediate portion of the bracket. The improved bracket comprises an intermediate or main body plate or section 8 of angled form having integrally formed on the pointed end 9 thereof a pair of connecting arms or straps 10 directed at substantially right angles to one another and curved downwardly out of the plane of the main body section 8. Integrally connected to the outer ends of the curved arms or straps 10 is an outer angled section or toe plate 11 constructed of two arms positioned at substantially right angles to one another, the ends of said arms being integral with the ends of the curved arms 10. The toe plate 11 is flat and is positioned in a plane offset and parallel to the plane of the main plate section 8. Integrally formed on the opposite ends 12 of the main plate section 8 are a pair of inwardly directed arms or straps 13 which are bent or curved upwardly out of the plane of the main plate section 8 in a direction opposite from the direction of the curved arms 10. The arms 13 are curved complementally to the curvature of the curved section 7 of the metal frame members 1. Integrally connecting the two approaching ends of the arms 13 is a flat metal heel plate 14 of angled shape, the point of the angle being directed toward the points of the main body plate 8 and the toe plate 11. The heel plate 14 is disposed in a plane parallel to the plates 8 and 11.

It will thus be seen that the improved mitering bracket comprises three angled plates with the end angle plates being disposed in planes on the opposite sides of the main or intermediate angled plate section with which said end plate sections are integrally connected by means of the angled straps 10 and 13, respectively. The shape of the bracket is such that it can be conveniently seated within the corner of a metal frame with the intermediate or main plate section seating against the inner faces of the flat portions 4 of the frame members while the toe plate 11 is adapted to seat in the outer corner of the corner of the frame against the inner faces of the outer flat portions 3 of said frame members. The heel plate 14 connected to the main plate section 8 by means of the curved straps or arms 13 is adapted to seat in the inner corner of the frame section against the inner flat faces 5 of the frame members 1. This arrangement is clearly illustrated in Figures 2 and 3 of the drawings. It will thus be seen that the improved bracket extends diagonally through the corner of the frame from the inner corner to the outer corner thereof with the plate portions 8, 11, and 14 seated flatly against the flat portions 4, 3, and 5, respectively, of the frame members. After a bracket has been mounted in position, as described, each of the plate sections 8, 11, and 14 are indented and preferably spot welded at a plurality of points 15 on opposite sides of the abutting mitered edges of the frame members by means of the improved bracket with the mitered edges of the frame members tightly abutting one another to form a solid frame corner.

It will thus be seen that an improved method is provided for forming mitered frame joints by providing a one piece offset bracket having a plurality of plate sections connected by means of arms curved complementally to the curvature of portions of the frame members so that the entire bracket may be conveniently seated diagonally in the corner of a metal frame and welded to the frame members to rigidly hold the same together to form a mitered frame joint.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A mitered joint bracket comprising a flat intermediate angle plate, a flat angle toe plate, curved arms integrally connecting said toe plate with said intermediate angle plate, a flat angled heel plate disposed in a plane parallel to the intermediate angle plate, and curved arms integrally connecting said heel plate with said intermediate angle plate.

2. A mitered joint bracket comprising a flat intermediate plate, flat end plates positioned above and below the same, and arms integrally connecting said flat end plates with said intermediate plate.

3. A mitered joint bracket comprising a flat intermediate plate, flat end plates, and curved arms integrally connecting said intermediate plate with said end plates to hold said end plates positioned in planes parallel to and on opposite sides of the plane of said intermediate plate.

4. A mitered joint bracket constructed of a single piece of sheet metal comprising an intermediate angle plate, an angled toe plate, curved arms integrally connecting said angled toe plate with one end of the intermediate angle plate to hold said toe plate in a plane parallel to one side of the intermediate plate, an angled heel plate, and curved arms integrally connected to the ends of said angled heel plate and to the opposite end of said intermediate plate to hold said plate in a plane parallel to the intermediate plate on a side opposite from that in which the toe plate is positioned.

5. A mitered joint bracket comprising a plurality of flat angle plates having the apexes thereof directed in the same direction, and means for integrally connecting said plates to hold the same in different parallel planes.

In testimony whereof we have hereunto subscribed our names at Chicago, Cook County, Illinois.

PERCY D. PECK.
WINGATE S. THOMAS.